United States Patent [19]
Sakudo et al.

[11] Patent Number: 4,543,465
[45] Date of Patent: Sep. 24, 1985

[54] MICROWAVE PLASMA SOURCE HAVING IMPROVED SWITCHING OPERATION FROM PLASMA IGNITION PHASE TO NORMAL ION EXTRACTION PHASE

[75] Inventors: Noriyuki Sakudo, Ohme; Katsunobu Abe, Katsuta; Katsumi Tokiguchi, Machida; Hidemi Koike, Tokorozawa; Osami Okada, Chofu, all of Japan

[73] Assignee: Hitachi, Ltd., Tokyo, Japan

[21] Appl. No.: 517,404

[22] Filed: Jul. 26, 1983

[30] Foreign Application Priority Data

Aug. 30, 1982 [JP] Japan ............................. 57-149226

[51] Int. Cl.⁴ .......................... B23K 9/00; H01J 27/00
[52] U.S. Cl. ...................... 219/121 PD; 219/121 PG; 204/192 N; 204/192 E; 156/345; 315/111.41; 313/156
[58] Field of Search ................. 219/121 PD, 121 PG, 219/121 PF, 10.55 R, 123; 204/164, 192 E, 192 N; 156/646, 643, 345; 313/156, 161, 231.31; 315/111.41, 111.81

[56] References Cited

U.S. PATENT DOCUMENTS

| | | | |
|---|---|---|---|
| 3,430,138 | 2/1964 | Suzuki et al. | 204/192 E |
| 4,058,748 | 11/1977 | Sakudo et al. | 313/156 |
| 4,101,411 | 7/1978 | Suzuki et al. | 219/121 PD |
| 4,316,791 | 2/1982 | Taillet | 219/10.55 R |
| 4,322,661 | 3/1982 | Harvey | 313/156 |
| 4,362,972 | 12/1982 | Donaldson | 313/156 |

*Primary Examiner*—M. H. Paschall
*Attorney, Agent, or Firm*—Antonelli, Terry & Wands

[57] ABSTRACT

In a microwave plasma source, a discharge space supplied with a microwave electric field is supplied with a DC magnetic field. A material to be ionized is introduced into the discharge space to produce plasma, whereby ions are extracted through an ion extracting system. A switch is provided for effecting through switching operation the change-over of the magnetic field applied to the discharge space from the intensity for the ignition of plasma to the intensity for ion extraction in succession to completion of the plasma ignition.

11 Claims, 4 Drawing Figures

MICROWAVE PLASMA SOURCE HAVING IMPROVED SWITCHING OPERATION FROM PLASMA IGNITION PHASE TO NORMAL ION EXTRACTION PHASE

BACKGROUND OF THE INVENTION

The present invention generally relates to a microwave plasma source in which a high frequency discharge in a magnetic field is made use of and which finds applications in a microwave plasma etcher, a plasma depositer and others. In particular, the present invention concerns the microwave plasma source which exhibits an improved performance or operability upon switching from a plasma ignition phase to a normal ion extraction phase.

As an ion source apparatus capable of extracting a high ion current which is required for ion implantation and ion beam deposition in the semiconductor industry, there is disclosed in U.S. Pat. No. 4,058,748 a typical microwave plasma source apparatus in which a high frequency discharge in a magnetic field is made use of. In this known microwave plasma source apparatus, however, the magnetic field intensity required for ignition of plasma differs at a ratio of about 10/6 from the magnetic field intensity required usually for ion extraction which takes place in succession to the plasma ignition phase or mode. As the consequence, operation for readjusting the value of magnetic field intensity is indispensable upon transition from the plasma ignition phase or mode to the ion extraction phase or mode. More specifically, the magnetic field of high intensity set for the plasma ignition mode has to be readjusted to a magnetic field of low intensity for the ion extraction mode through a dial operation which is not only a troublesome procedure but also accompanied with the possibility of erroneous operation. Under the circumstance, there has been a demand for improvement in this respect.

SUMMARY OF THE INVENTION

Accordingly, an object of the present invention is to provide a microwave plasma source apparatus which allows the switching or change-over of the magnetic field intensity to be affected through a significantly facilitated operation.

For accomplishing the above object, there is provided according to an aspect of the present invention a microwave plasma source apparatus of the type in which a DC magnetic field is applied to a discharge space supplied with a microwave electric field and a material to be ionized is introduced into the discharge space to thereby generate plasma, wherein ions are extracted by way of an ion extracting system. The microwave plasma source according to the invention is characterized by provision of a switch for effecting through a switching operation the change-over of the intensity of magnetic field applied to the discharge space upon plasma ignition to the magnetic field intensity applied to the discharge space in the ion extracting phase in succession to the completed plasma ignition phase.

By virtue of the characteristic arrangement taught by the invention, the magnetic field intensity readjusting procedure which has been effected upon transition from the plasma ignition phase to the ion extraction phase by resorting to the troublesome dial operation can be realized by a simple change-over operation using a switch.

Thus, there is provided according to the invention a microwave plasma source which enjoys an improved operability and is immune to the possibility of erroneous adjustment.

DESCRIPTION OF THE PREFERRED EMBODIMENTS

Figure 1:
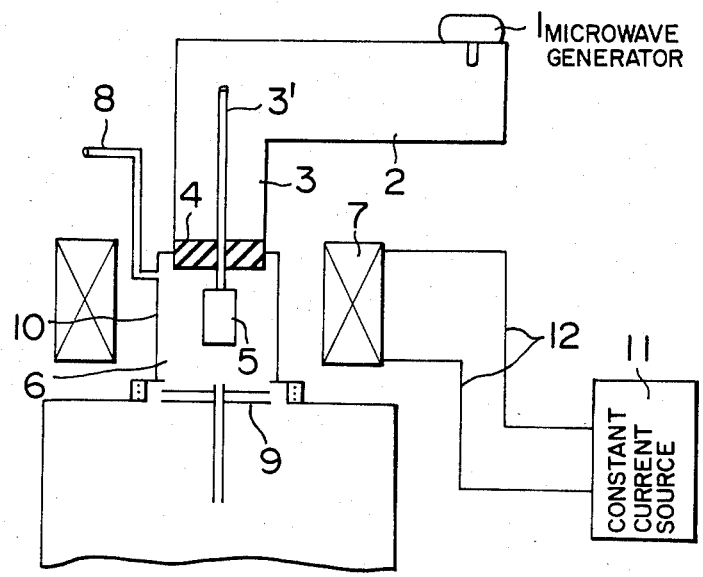
FIG. 1 is a view showing a basic arrangement of a microwave plasma source apparatus according to an embodiment of the present invention.

FIG. 1 shows a basic arrangement of a microwave plasma source apparatus according to an embodiment of the invention.

In general, a high frequency (microwave) discharge is brought about by introducing a material to be ionized at a pressure of about $1 \times 10^{-2}$ to $1 \times 10^{-4}$ Torr into a discharge space which is supplied with a microwave electric field and a DC magnetic field applied orthogonally to the electric field. Referring to FIG. 1, microwave of 2.45 GHz, for example, is introduced into a coaxial cable 3 from a microwave generator 1 through a rectangular waveguide 2. The discharge space denoted by a numeral 6 is defined by a microwave-plasma coupler coupled to an inner conductor 3' of the coaxial conductor 3 and a wall 10. A microwave electric field is generated within the discharge space 6 by the microwave emitted from the microwave-plasma coupler 5. When a gas or vapor of $PH_3$, $BF_3$ or the like is introduced into the discharge space 6 by way of a gas inlet pipe 8 while a magnetic field interacting with the microwave electric field is generated by means of a coil 7 for generating a magnetic field, plasma is produced within the discharge space 6. From the plasma produced within the discharge space 6, ions are extracted through an ion extraction system 9. The magnetic field generating coil 7 is supplied with a current from a constant current source 11 through wires 12 to generate the magnetic field in the discharge space 6. A reference numeral 4 denotes a vacuum sealing dielectric.

Figure 2:
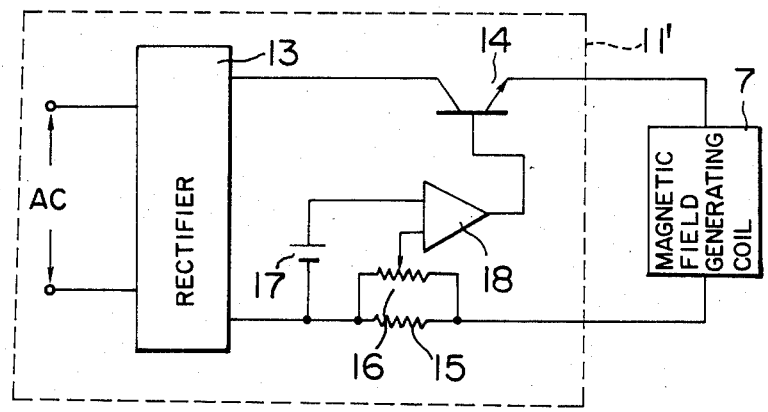
FIG. 2 is a circuit diagram of a hitherto known electric circuit for a coil.

FIG. 2 shows a hitherto known constant current source 11' which corresponds to the constant current source 11 shown in FIG. 1. Referring to FIG. 2, an AC power supplied through AC terminals represented by AC is converted by a rectifier 13 into a DC power which is supplied to the magnetic field generating coil 7 by way of a control transistor 14. The current flowing through the magnetic field generating coil 7 makes appearance as a voltage signal across a pick-up resistor 15. A voltage signal which is in proportion to the voltage signal appearing across the pick-up resistor 15 is prepared by means of a potentiometer 16. When a difference voltage between the voltage signal thus prepared and a reference voltage signal produced by a reference voltage generator 17 is put into the control transistor 14 after having been amplified by an error amplifier 18 which is constituted by a differential amplifier, a current corresponding to the voltage signal set by the potentiometer 16 flows through the magnetic field generating coil 7. In conjunction with the microwave plasma source, it will be recalled that the magnetic field intensity for the ignition of plasma has to be about 1.5 times or more as high as the magnetic field intensity for the succeeding ion extraction. To this end, the set value of the potentiometer 16 has been readjusted by manipulating it upon transition from the plasma ignition phase to the ion extraction phase in the case of the hitherto known microwave plasma source.

Figure 3:
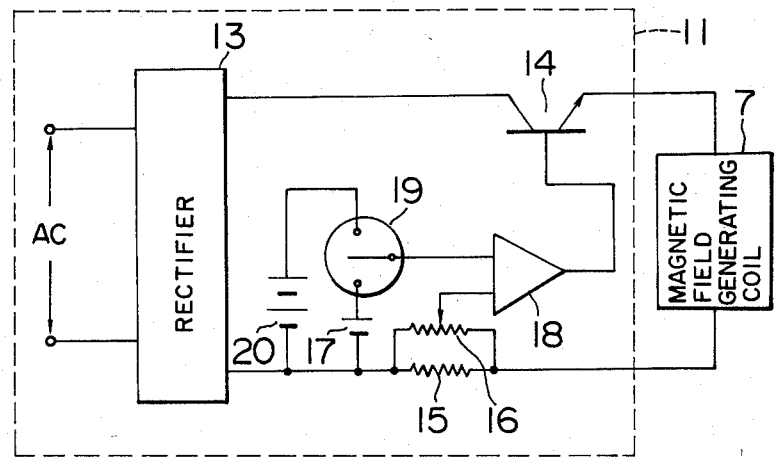
FIG. 3 is a circuit diagram of an electric circuit for a coil according to the present invention.

In contrast, in the constant current circuit 11 according to the present invention shown in FIG. 3, the value of the current flowing through the magnetic field generating coil is changed with the aid of a switch upon transition from the plasma ignition phase to the ion extraction phase. It will be seen from the comparison with the hitherto known constant current circuit 11' shown in FIG. 2 that a switch 19 and a reference voltage regulator for ignition denoted by a numeral 20 are additionally provided. By setting the voltage generated by the reference voltage regulator 20 at a value which is about 1.6 times as high as the output voltage of the reference voltage generator 17 used in the hitherto known constant current circuit 11' shown in FIG. 2, the transition from the ignition phase to the ion extraction phase can be readily realized in a much facilitated manner merely by changing a movable element of the switch 19 from the reference voltage regulator 20 for ignition to the reference voltage generator 17 without necessitating the procedure for readjusting the set value of the potentiometer 16 upon transition of the ignition phase to the ion extraction phase.

Figure 4:
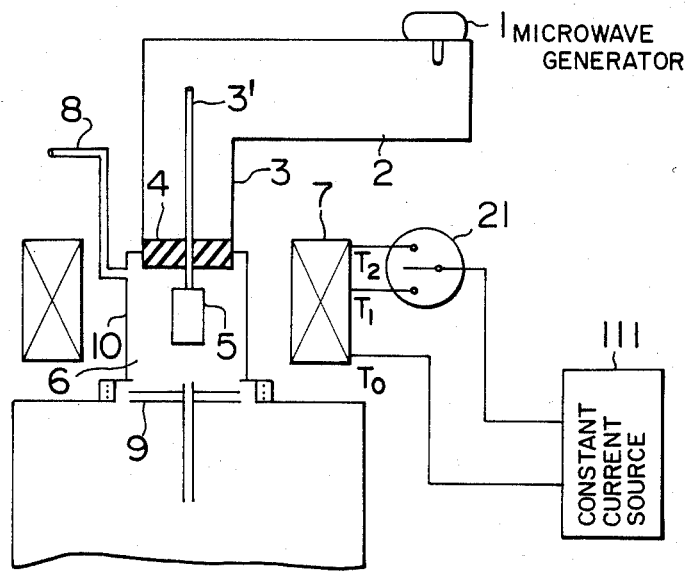
FIG. 4 is a view showing a basic arrangement of the microwave plasma source apparatus according to another embodiment of the present invention.

FIG. 4 is a circuit diagram showing another embodiment of the present invention which is so arranged that the number of turns of the magnetic field generating coil connected to a constant current source 111 is changed by a switch 21 between the plasma ignition phase and the ion extraction phase. The embodiment shown in FIG. 4 differs from the circuit arrangement shown in FIG. 1 in that the winding constituting the magnetic field generating coil 7 is provided with a beginning terminal $T_0$, a middle terminal $T_1$ and an end terminal $T_2$ and that a changeover switch 21 is additionally provided. By selecting the number of turns of the coil 7 wound between the terminals $T_0$ and $T_2$ about 1.6 times or more as large as the number of turns between the terminals $T_0$ and $T_1$, the intensity of the magnetic field supplied to the discharge space 6 can be readily changed merely by corresponding change-over operation of the switch 21.

In the foregoing description of the embodiments of the invention shown in FIGS. 3 and 4, it has been assumed that the magnetic field generating coil 7 is supplied with a current from a constant current source (11, 111). However, the invention is never restricted to the use of such constant current source. It is obvious in the light of the teachings of the invention that similar effects to those obtained in the illustrated embodiments can be attained even by adopting any type of the constant current source. Further, although the magnetic field coil 7 is provided with the middle terminal for electrically dividing the coil into the windings of different numbers of turns in the case of the embodiment shown in FIG. 4, the invention also is never restricted to this configuration. It goes without saying that separate or independent coils may be so connected together that the desired effect can be obtained. Further, such a circuit arrangement also readily occur to those skilled in the art without departing from the invention in which the magnetic field of high intensity for the ignition mode is generated for a predetermined period (e.g. 1 second) upon single actuation of a bottom, which is automatically followed by the generation of the magnetic field of low intensity (for ion extraction mode). Many other modifications will readily occur to those skilled in the art without departing from the spirit and scope of the invention.

As will be appreciated from the foregoing, it is possible according to the teaching of the invention to change correspondingly the magnetic field intensity for the plasma ignition phase and the ion extraction phase by a simple switching operation of a switch without necessitating the troublesome operation of readjusting the set value of the potentiometer, whereby the operability of the microwave plasma source in the starting operation phase can be significantly improved.

We claim:

1. A microwave plasma source comprising a discharge space, means for feeding a discharge gas into said discharge space, a microwave generator, means for guiding microwaves into said discharge space, magnetic field generating means for generating a magnetic field in said discharge space having the microwaves and discharge gas supplied thereto, said magnetic field generating means generating a magnetic field of a first intensity for enabling ion extraction from plasma in said discharge space and for generating a magnetic field of a second intensity for enabling ignition of plasma in said discharge space, a current source for supplying a current to a coil of said magnetic field generating means, control circuit means for controlling the current supplied to the coil, said control circuit means including a potentiometer set at a predetermined position for generating the first magnetic field intensity for an ion extraction phase, and a change-over switch for changing the magnetic field intensity generated by said magnetic field generation means between the first magnetic field intensity for an ion extraction phase and the second magnetic field intensity for a plasma ignition phase while said potentiometer remains set at said predetermined position.

2. A microwave plasma source according to claim 1, further comprising ion extracting means coupled to said discharge space for extracting ions from said discharge space.

3. A microwave plasma source according to claim 1, wherein said change-over switch changes over the current supplied to said coil between a first value utilized for generating the first magnetic field intensity and a second value utilized for generating the second magnetic field intensity.

4. A microwave plasma source according to claim 1, wherein said change-over switch changes the number of winding turns of the coil between a first number of winding turns utilized for generating the first magnetic field intensity and a second number of winding turns utilized for generating the second magnetic field intensity.

5. A microwave plasma source comprising a discharge space, means for feeding a discharge gas into said discharge space, a microwave generator, means for guiding microwaves into said discharge space, magnetic field generating means for generating a magnetic field in said discharge space having the microwaves and discharge gas supplied thereto, said magnetic field generating means generating a magnetic field of a first intensity for enabling ignition of plasma in said discharge space and for generating a magnetic field of a second intensity for enabling ion extraction from the plasma in said discharge space, change-over switch for changing the magnetic field intensity generated by said magnetic field generating means from the first magnetic field intensity for a plasma ignition phase to the second magnetic field intensity for an ion extraction phase after completion of the plasma ignition phase, a current source for supplying a current to said magnetic field generating means, said magnetic field generating means including a coil, said current being supplied to said coil, said change-over switch changing over the current supplied to said coil from a first value utilized for generating the first magnetic field intensity to a second value utilized for generating the second magnetic field intensity, and control circuit means for controlling the current supplied to said coil, said control circuit means including a potentiometer set at a predetermiined position for supplying an output signal indicative thereof, a first reference signal generator for generating a first reference signal and a second reference signal generator for generating a second reference signal, error means having a first input terminal for receiving the output signal of said potentiometer means and a second input terminal for receiving an output from one of said first reference signal generator and said second reference signal generator for providing an error signal for controlling the current supplied to said coil for the first value based upon the difference between the signals from said potentiometer means and said first reference signal generator and for the second value based upon the difference in the signals from said potentiometer means and said second reference signal generator, said change-over switch being connected to the second input terminal of said error means and one of the outputs of said first reference signal generator and said second reference signal generator.

6. A microwave plasma source comprising a discharge space, means for supplying a microwave electric field to said discharge space, means for introducing a material to be ionized into said discharge space, magnetic field generating means for generating a magnetic field in said discharge space having said material and said microwave electric field supplied thereto, said magnetic field generating means generating a magnetic field of a first intensity for enabling ignition of plasma in said discharge space and for generating a magnetic field of a second intensity for enabling extraction of ions from said discharge space, and control means for said magnetic field generating means for instanteously changing the intensity of the magnetic field between the first magnetic field intensity for ignition of the plasma and the second magnetic field intensity for extraction of ions, said control means including a signal providing means having a predetermined setting for providing an output signal for enabling the generation of at least one of the first and second magnetic field intensities, and change-over switch means for instantaneously switching between the first and second magnetic field intensities without changing said predetermined setting of said signal providing means.

7. A microwave plasma source according to claim 6, further comprising ion extracting means coupled to said discharge space for extracting ions from said discharge space.

8. A microwave plasma source according to claim 6, wherein said signal providing means includes a current source for supplying a predetermined current to said magnetic field generating means, said magnetic field generating means including a coil formed of a number of winding turns, said predetermined current being supplied to said coil, said change-over switch means instantaneously changing the number of winding turns of said coil from a first number of winding turns utilized for generating the first magnetic field intensity to a second number of winding turns utilized for generating the second magnetic field intensity.

9. A microwave plasma source according to claim 6, wherein said control means includes a current source for supplying a current to a coil of said magnetic field generating means, said signal providing means including a potentiometer having said predetermined setting for providing an output signal for enabling the generation of at least one of the first and second magnetic field intensities, and said change-over switch means instantaneously switching between the first and second magnetic field intensities without changing said predetermined setting of said potentiometer.

10. A microwave plasma source according to claim 9, wherein said change-over switch means changes over the current supplied to said coil between a first value utilized for generating a first magnetic field intensity and a second value utilized for generating the second magnetic field intensity.

11. A microwave plasma source according to claim 9, wherein said change-over switch means changes the number of winding turns of the coil between a first number of winding turns utilized for generating the first magnetic field intensity and a second number of winding turns utilized for generating the second magnetic field intensity.

* * * * *